June 2, 1931. L. BARNETT 1,808,011
ELECTRIC FITTING
Filed Jan. 11, 1929
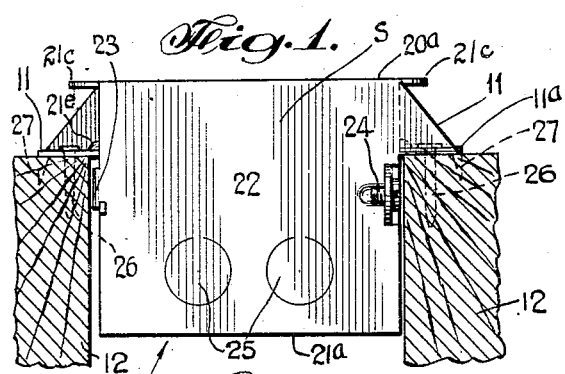
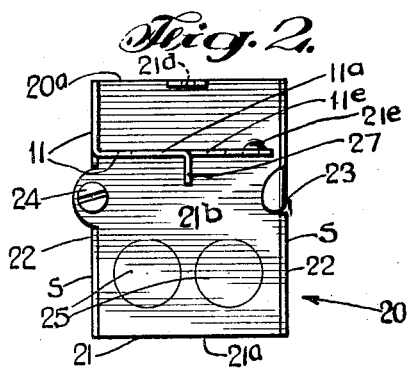
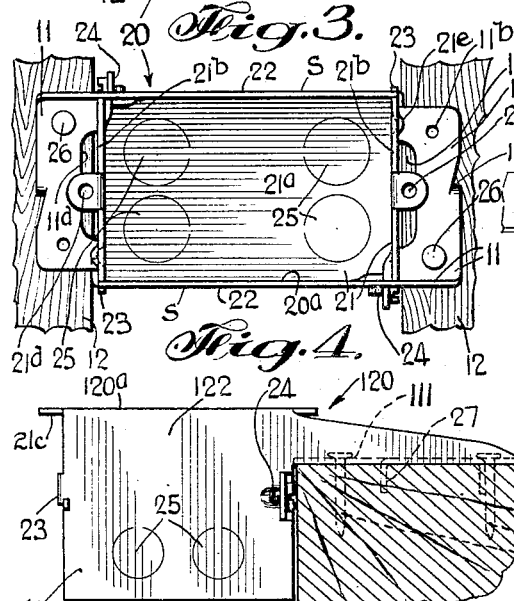
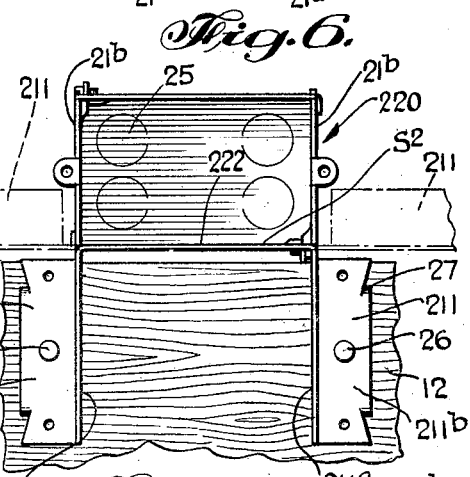
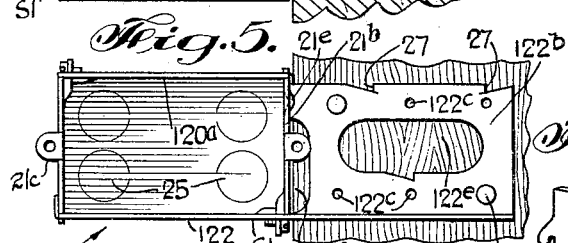
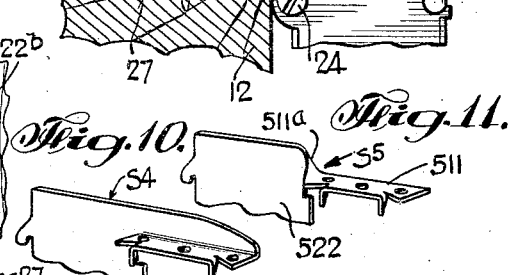
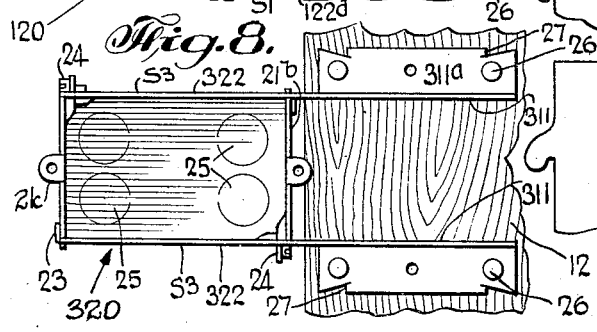
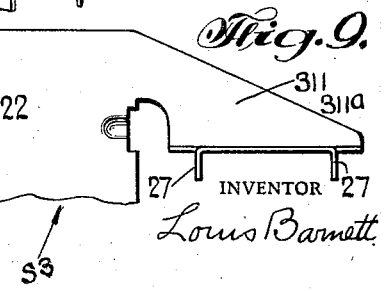
INVENTOR
Louis Barnett Patented June 2, 1931

1,808,011

UNITED STATES PATENT OFFICE

LOUIS BARNETT, OF BROOKLYN, NEW YORK, ASSIGNOR TO STANDARD ELECTRIC EQUIPMENT CORPORATION, OF LONG ISLAND CITY, NEW YORK, A CORPORATION OF DELAWARE

ELECTRIC FITTING

Application filed January 11, 1929. Serial No. 331,863.

This invention relates to electric fittings such as outlet, junction or switch boxes used in wiring building installations and more particularly is directed to improved boxes of the character described having supporting attachment boxes of novel construction.

One object of the invention is to provide improved part or parts for converting standard outlet, junction or switch boxes constructed of stamped sheet metal to boxes of the character described having integrally incorporated in their structure supporting attachment bases.

Another object of the invention is to provides boxes of the character described of improved construction comprising in combination an assembly of conventional and novel parts including supporting attachment bases integrally formed with the latter parts.

A further object of the invention is to provide improved boxes of the character described comprising few and simple parts, which shall be easy and quick to assemble to form strong, rugged structures, and which shall be cheap to manufacture, handy and convenient to install under conventional and unusual building requirements at a minimum labor cost, and practical and efficient to a high degree in use.

Other objects and advantages will in part be obvious and in part hereinafter pointed out.

The invention accordingly consists in features of construction, combination of elements and arrangement of parts, which will be exemplified in the constructions hereinafter disclosed of which a scope of the application will be indicated in the following claims.

In the accompanying drawings in which several possible embodiments of the invention are shown, Figs. 1, 2 and 3 are front elevational, side elevational (dismounted) and top plan views, respectively, of an electric switch or junction box constructed to embody the invention, shown mounted between two supports or studs.

Figs. 4 and 5 are front elevational and top plan views, respectively, of a modified construction of the improved box adapted to be mounted from an end thereof to overhang a support.

Figs. 6 and 7 are plan and side elevational views, respectively, of the improved box showing another modified construction adapted to be mounted from a long side thereof in an overhanging position. In Fig. 6, the dotted lines show the position of the extending supporting bases before being bent in position shown in full lines.

Fig. 8 is a top plan view of the improved box adapted to support the box in an overhanging position from a support or stud in a plane, a distance substantially one-half the depth of the box, below the level of the top thereof.

Fig. 9 is a fragmentary front elevational view of a side of the improved box shown in Fig. 8 showing the location of the integral extending supporting base portion relative to the side wall portion.

Fig. 10 is a fragmentary perspective view showing a modified construction of one of a pair of stampings for use with the improved box in mounting on supports as shown in Figs. 4 and 5.

Fig. 11 is a fragmentary perspective view of an integral extending supporting base stamping of the improved boxes formed with a twisted portion in place of an angle structure shown in the other figures.

The present electric wiring construction and installation methods because of the comparatively high labor cost requires that all electric fittings be completed or assembled as far as practical by relatively cheap factory methods so as to eliminate as much as possible such work on the field or job. Furthermore, building construction has been standardized to a greater extent than heretofore so that it is now less important to provide a great many detachable supporting devices for mounting fittings in conventional and unusual installation requirements. To this end the present invention provides a few improved types of box fittings suitable for practically all installations, said fitting having novelly constructed extending attachment supporting bases which can be cheaply manufactured and supplied to the trade from the factory. The improved box fitting embodying the invention does away with forming attachment supports separately from the box fitting, saves the cost of assembling and also simplifies the manufacturing process since all screws and tapped holes excepting those, if any, that are used for interlocking the box walls are eliminated.

Referring in detail to the drawings, 20 denotes an electric box fitting embodying the invention, said box being shown mounted by means of novelly constructed extending supporting attachment members 11 between building structure members or studs 12.

The box fitting 20 may be of any standard or conventional construction modified as herein described to incorporate the invention. As shown, the box fitting 20 is of the outlet, junction or switch type made of suitable sheet metal stampings, such as a blank 21 bent to form the bottom 21a and end walls 21b, interlocked with spaced identical blanks S having plate side wall portions 22 by hook and screw fastening connection means 23 and 24, respectively, to provide a rectangular shaped open side 20a. The latter is bound by the relatively long plate side wall portions 22 of blank S, and said short end walls 21b.

The wall portions and short walls 22 and 21b, respectively, and the bottom 21a may each be provided with closed "knockouts" 25 partially punched from the sheet material of the blanks in the well understood manner. Each short wall 21b has outwardly extending therefrom the usual lug 21c. Said lugs are each provided with a threaded hole 21d for engaging with a screw fastened closure or flush plate (not shown). The latter is adapted to be fitted over the open side 20a after completing the wiring installation in the well understood manner.

The box construction above described has the extending supporting attachment members 11 formed integrally with the long wall portions 22. As seen from Figs. 1, 2 and 3, each blank S has member 11 and the long wall portion 22 stamped as a single piece with said member 11 adapted to extend beyond an end wall 21b, said blank S being partially severed transverse the length of the long wall portion 22 and bent at right angles thereto to form a base 11a which lies in a plane parallel to and below the open side 20a of the box. Said base 11a may be perforated as at 11b for receiving nails 26 to fasten the box to the studs 12. Edge portions 11e of the base may be sheared and bent to provide prongs 27, said prongs serving to retain the box 20 temporarily in a desired position preparatory to driving the fastening nails 26.

The base 11a may also be cut away at 11d for lightening the structure and to provide clearance and to avoid obstructing leading ends of fastening screws (not shown) thread through the lug holes 21d and extending beyond said base.

If desired the end wall 21b may be punched to provide a protuberance 21e for abutting the inner edge of the base 11a thereagainst to brace the latter.

It should be noted that the long walls 22 with the integral members 11 are identical in size, shape and construction and may be interchanged. Thus a standard box fitting may be converted into the novel box 20 by merely replacing the usual long wall by the improved stamped and bent blank S with the integral extending supporting attachment members. In the improved construction of box 20 the usual separate attachment supporting devices required and the necessity of providing the tapped holes and screw fastening means for mounting said devices as well as the operation of assembling such supports to the box as in the conventional construction are entirely eliminated.

Where the box fitting is to be supported in an overhanging position from one of the ends thereof, the box 120 constructed as shown in Figs. 4 and 5, is provided. Here merely one novel side wall stamping or blank S1 is required. Said stamping S1 comprises the long wall portion 122 and an extending attachment member 111 integrally formed therewith. The member 111 extends directly outward beyond the end wall 21b of the box, said blank S1 being partially severed transverse the length thereof to form an edge of the long wall portion 122. The portion of the member 111 beyond the said severed edge of the long wall portion 122 is bent at right angles to form the broad wide base 122b which lies in a plane parallel to and below the open side 120a of the box. Like the base 11a of the stamping S shown in Figs. 1, 2 and 3, the base 122b may be perforated with rows of holes 122c for receiving fastening nails 26. The base 122b may also be cut away at 122d and 122e for lightening the structure.

In Figs. 6 and 7 a modified form of the invention is shown which is particularly useful where the box fitting must be mounted to overhang a support with the long dimension of the fitting extending lengthwise the support 12. Here the box 220 requires but one novel side wall stamping S2. Said stamping S2 comprises the long wall portion 222 forming a middle section with spaced attachment members 211 integrally extending from opposite sides thereof adjacent the top opening. Each member 211 comprises a wing 211a bent to extend in alignment with the end walls 21b of the box. The wings 211a each have a portion 211b bent at right angles with relation to the long walls of the box to form an attachment base which may be formed with prongs 27 and is perforated to receive nails 26.

Where the box fitting requires mounting the top opening thereof, a substantial distance above the supporting stud 12 and in an overhanging position, the construction shown in Figs. 8 and 9 may be used. Here the box 320 includes the stamping S3 having side wall portions 322 and integral attachment members 311 extending beyond the end wall 21b of the box. The members 311 each have a portion bent at right angles with relation to the side wall portions 322 to form an attachment base 311a. The latter may be provided with prongs 27 and is perforated to receive nails 26. The stamping S4 shown in Fig. 10 is similar in construction to that described above and shown in Fig. 9 and may replace stamping S1 and the side wall of the box opposite said stamping shown in Figs. 5 and 6 where it is desired to have two separate attachment bases instead of the single one provided by stamping S1.

It is to be understood that the attachment bases described above which are angular may be constructed as shown in Fig. 11.

Here the stamping S5 includes an extending attachment base 511 which comprises a strip having a twist portion 511a for positioning the base at right angles to the box side wall portion 522.

It will thus be seen that there is provided a device in which the several objects of this invention are achieved and which is adapted to meet the conditions of practical use.

As various other possible embodiments might be made of the above invention and as various changes might be made in the embodiments set forth, it is to be understood that all matters herein set forth as shown in the accompanying drawing are to be interpreted as illustrative and not in a limiting sense.

Having thus described my invention I claim as new and desire to secure by Letters Patent:

1. In combination, a sheet metal part shaped and bent to form the bottom and end walls of an electric box fitting, edges of end walls being in the plane of an open side of said fitting, and a sheet metal stamping interlocking with said part to form a side wall of the fitting, said stamping having an integral flat portion shaped and bent to lie in a plane parallel with respect to the open side of the box for forming an attachment device adapted to mount the fitting on a support.

2. In an electric fitting of the character described having a conventional sheet metal part shaped and bent to form a bottom and end wall of a box, a sheet metal stamping having one portion interlocking with said part forming a side wall for the box and another portion extending beyond said end wall bent to lie in a plane at right angles with respect to said side wall portion to provide an attachment base adapted to mount the fitting on a support.

3. A plurality of sheet metal parts interconnected to form a box fitting of the character described, one of said parts forming a wall of said fitting and having an integral extension projecting from one edge thereof adjacent to and abutting an end wall, said extension formed with means in offset, non-parallel relation with respect to said wall part for attaching the fitting to the face of a stud.

4. As an article of manufacture, a sheet metal part interchangeable with a flat side wall of a box fitting of conventional construction, which has an integral sheet metal stamping comprising a bottom wall and end walls, said part having an integral portion extending beyond the fitting formed with attachment means disposed at right angles to the plane of said flat side wall for supporting the fitting from the face of a support.

In testimony whereof I affix my signature.

LOUIS BARNETT.